United States Patent
Polsky et al.

(10) Patent No.: US 10,451,497 B2
(45) Date of Patent: Oct. 22, 2019

(54) STRESS SENSOR FOR CEMENT OR FLUID APPLICATIONS

(71) Applicant: UT Battelle, LLC, Oak Ridge, TN (US)

(72) Inventors: Yarom Polsky, Oak Ridge, TN (US); Michael J. Lance, Oak Ridge, TN (US); James Gordon Hemrick, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 36 days.

(21) Appl. No.: 15/675,473

(22) Filed: Aug. 11, 2017

(65) Prior Publication Data

US 2019/0049324 A1 Feb. 14, 2019

(51) Int. Cl.
| | | |
|---|---|---|
| *G01L 1/24* | (2006.01) | |
| *E21B 47/00* | (2012.01) | |
| *E21B 33/14* | (2006.01) | |
| *E21B 49/00* | (2006.01) | |

(52) U.S. Cl.
CPC .............. *G01L 1/242* (2013.01); *E21B 33/14* (2013.01); *E21B 47/0006* (2013.01); *E21B 49/00* (2013.01)

(58) Field of Classification Search
CPC ........ G01N 33/24; G01N 33/38; G01L 1/242; E21B 33/14; E21B 47/0006; E21B 49/00
USPC .......................................................... 73/784
See application file for complete search history.

(56) References Cited

U.S. PATENT DOCUMENTS

| | | | | |
|---|---|---|---|---|
| 4,900,699 | A * | 2/1990 | Newkirk | B28B 7/342 264/332 |
| 6,913,079 | B2 * | 7/2005 | Tubel | E21B 47/00 114/382 |
| 7,821,635 | B2 * | 10/2010 | Pope | G01J 3/28 356/326 |
| 8,230,915 | B2 * | 7/2012 | Weng | E21B 43/26 166/250.01 |
| 9,546,548 | B2 * | 1/2017 | Hartog | E21B 47/101 |
| 9,816,246 | B2 * | 11/2017 | Reinhall | E02D 13/005 |
| 9,841,315 | B2 * | 12/2017 | Taverner | G01H 9/004 |
| 2013/0082191 | A1 * | 4/2013 | Raghavan | C09K 11/02 250/459.1 |
| 2014/0239164 | A1 * | 8/2014 | Rothrock | G01N 21/534 250/227.11 |

\* cited by examiner

*Primary Examiner* — Octavia Hollington
(74) *Attorney, Agent, or Firm* — Benesch, Friedlander, Coplan & Aronoff LLP

(57) ABSTRACT

A system and method measuring subterranean stress. The system and method includes a non-destructive sheath enveloping a tubular structure positioned in direct contact with a lateral subterranean rock formation for sensing expansive changes in the subterranean rock formation. A fiber optic is directly embedded in the non-destructive sheath positioned adjacent to the exterior surface of the tubular structure. The fiber optic transmits light and thereafter receives light in proportion to the expansive changes in the subterranean rock formation. A spectrometer connected to the fiber optic remote from the non-destructive sheath. The spectrometer measures hydrostatic stress in the subterranean rock formation without estimating acoustoelastic effects or occluding the tubular structure.

22 Claims, 4 Drawing Sheets

STRESS SENSOR FOR CEMENT OR FLUID APPLICATIONS

STATEMENT REGARDING FEDERALLY SPONSORED RESEARCH AND DEVELOPMENT

This invention was made with United States government support under Contract No. DE-AC05-00OR22725 awarded by the United States Department of Energy. The United States government has certain rights in the invention.

BACKGROUND

Technical Field

This disclosure relates to measuring stress and more specifically to systems and processes that measure stress in cementitious materials.

Related Art

Concrete is a structural building material used in critical infrastructure around the world. When concrete fails, it can cause catastrophic results that isolate populations or expose them to hazards. In many instances, concrete fails because of its inability to support loads. Concrete's stress state is a measure of concrete's structural integrity especially when it is subject to changing loads.

DETAILED DESCRIPTION OF THE PREFERRED EMBODIMENTS

The unknown stress conditions of rock formations can make the exploration and the recovery of natural resources difficult. A wellbore that aids in the recovery of gas, oil, and water must counter the in situ stresses that tend to occlude it. Knowledge of the in situ state of stress is also critical for other subsurface resource extraction activities such as hydraulic fracturing and reservoir production. In wellbores, in situ stress may be estimated by an overcoring process at a single location through the use of a deformation gauge. The deformation gauge measures diametric deformation of a cross-section of a borehole through cantilevered sensors. The sensors make contact with the annular walls of a well. These sensors are difficult to mount, do not directly measure stress, and may occlude the well. When the sensors fail, the failure can cost valuable time and money, and compromise well integrity The disclosed systems and processes mitigate the risk of well collapse and are configured to directly measure subterranean hydrostatic stress at multiple depths. The systems and processes (collectively referred to as a system or systems) measure stress directly around the annulus of a borehole without occluding any portion of the borehole or estimating the acoustoelastic effects of rocks. The systems provide full zone isolation and reinforce the walls of a well by biasing some or all of the wellbore with optical transducing materials that may be moisture resistant, stiffen and harden easily, possess good plasticity, require low maintenance, are fire resistant, and have the ability to absorb and store energy (e.g., thermal mass). In some systems, the optical transducing materials include an alloy such as steel and cement.

Figure 1:
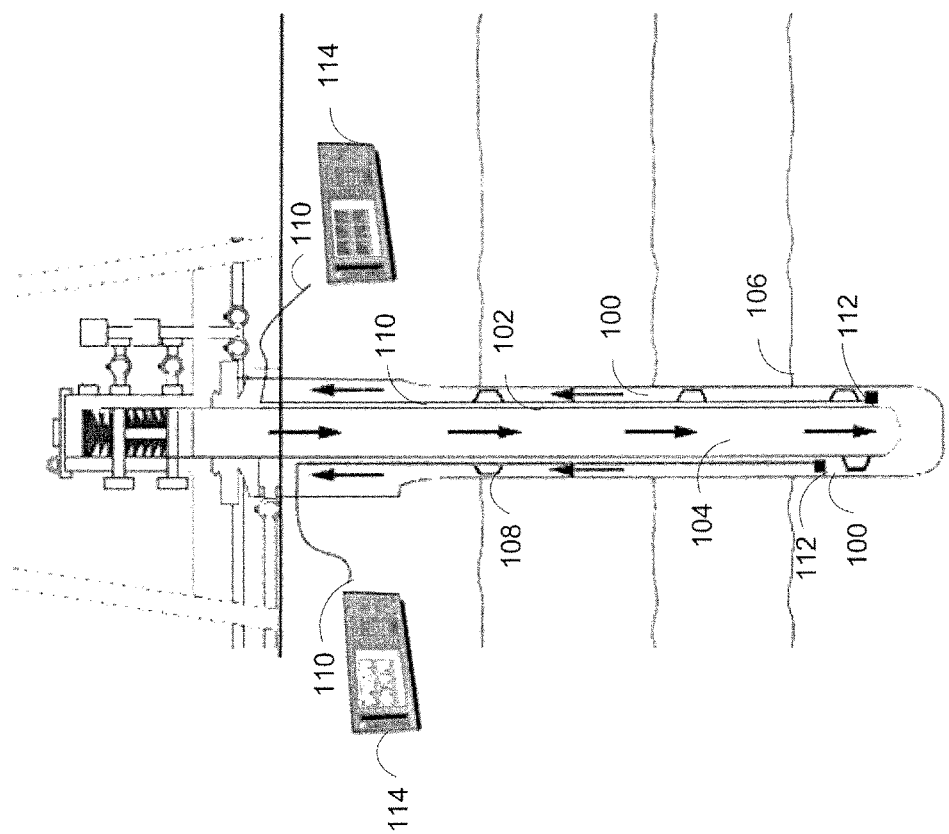
FIG. 1 is a cross-section of a wellbore with a plurality of in situ stress sensors.

In FIG. 1, hydrostatic stress is measured directly through a non-destructive system that transforms the primary cement that insulates a wellbore into an in situ stress gauge. The primary cement serves as a sheath within the annulus 100 between a tubular casing 102 (also referred to as the tubular or the tubular structure) and the rock formation 106. As shown by the arrows, primary cement is injected downward through the area 104 enclosed by the tubular casing 102 until it impinges at the bottom of the well or in the alternative, impinges a physical barrier such as an elastomeric plug that forces the cement up through the annulus 100 of the wellbore. In other systems, the material or primary cement is pumped directly through an upper opening of annulus 100 around the centralizers 108 that keep the tubular casing 102 in its proper placement and ensures a uniform sheath. The primary cement may be injected until the wellbore is partially or fully encased.

In FIG. 1, materials having piezospectroscopic and/or elastic properties are added to the primary cement before injection. The properties of the piezospectroscopic and/or elastic additive may be revealed through a photo stimulation that may include alpha-$Al_2O_3$ based materials. The piezospectroscopic effects are measured by one or more single-mode or a multi-mode fiber optics 110 (two fiber optic cables 110 shown in FIG. 1) that are embedded in the piezospectroscopic and/or elastic materials within the annulus 100 bounded by the tubular 102 and rock formation 106. In the single-mode or a multi-mode based system, the wavelength of the light transmitted through the fiber optics may lie in the absorption region of the photo-stimulated luminescence of the stress-sensing phase. When $Al_2O_3$ is used for example, a green or blue laser may be used. In some instances, any wavelength below the emission wavelength of 692 nm is used, such that the light is transmitted through the fiber optic 110 and mechanical coupling 112 that also receives the luminescence.

In operation, absorption region light is transmitted (by a source such as the laser that is not shown) through the fiber optic cable 110 embedded in the cement or concrete. Some of the incident laser light is absorbed by the alumina powder in the cement. The energy from the incident light nonradiatively de-excites down to 14400 and 14430 cm-1, which are the two emission lines known as R-lines because the emission occurs at 692 nm, in the red region of E-M spectrum. These peaks shift at about ~7.6 cm-1/GPa of hydrostatic stress. Here, the effect of temperature at the mechanical coupling 112 is accounted for and is compensated for by measuring stress free samples at the location or locations of interest and subtracting or adding the contribution representing the temperature contribution to the optical measures.

In FIG. 1 the piezospectroscopic and/or elastic materials, cement, and fiber optic cable serve as an in situ stress gauge or global mechanical integrity function of the cement or concrete. The piezospectroscopic and/or elastic materials provide pinpoint hydrostatic stress measurements (two such systems are shown in FIG. 1). It also serves as hydraulic seals that provide zone isolation. The piezospectroscopic and/or elastic materials, cement, and fiber optic cable provides zone isolation between the lateral rock formation 106 and the area 104 enclosed by the tubular 102 which further protects the tubular casing 102 against corrosion that would otherwise occur if fluid were to flow from the lateral rock formation 106 to the outer surface of the tubular 102.

In FIG. 1 the cement operation uses a Portland cement that consists substantially of anhydrous calcium silicate hydrate and calcium aluminate compounds that hydrate with water; in alternate operations other cement is used. The piezospectroscopic and/or elastic material additive and Portland cement has a relatively uniform grain structure and high elastic modulus. The former provides a uniform transfer of stress throughout the material while the latter provides a high elastic modulus of the piezospectroscopic and/or elastic materials (e.g., the stress-measuring medium).

Figure 2:
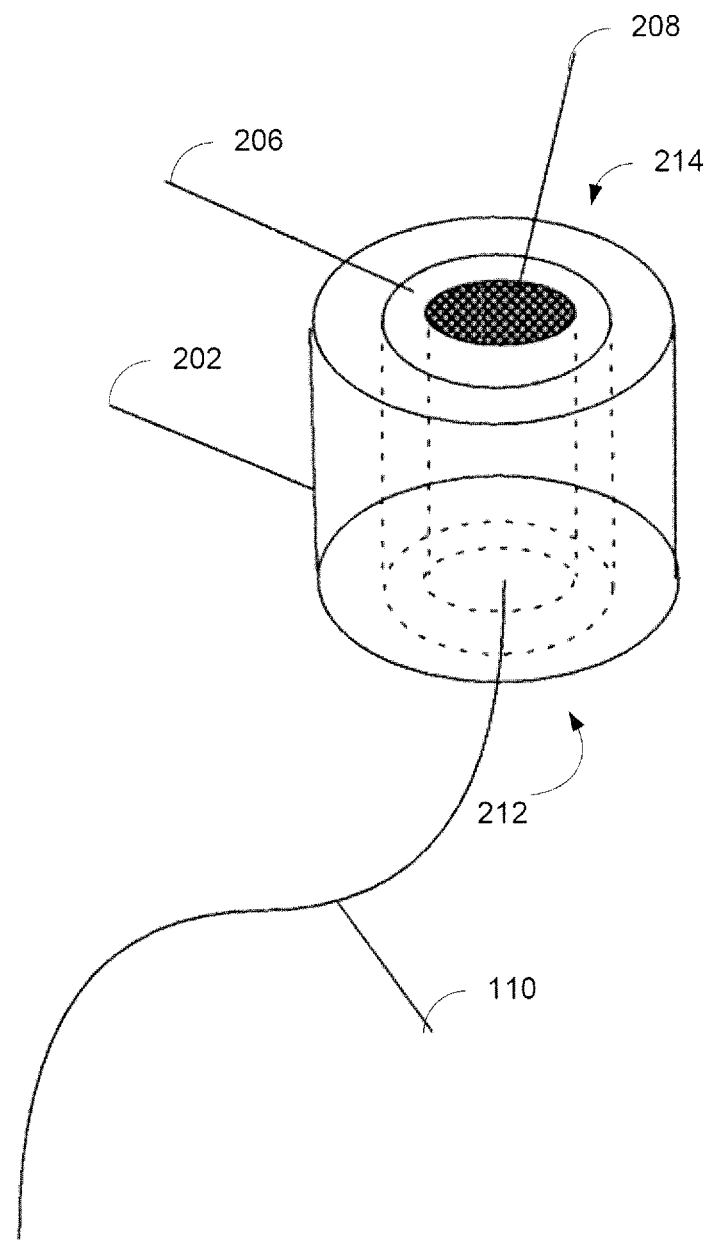
FIG. 2 is a cross-section of a directional stress sensor.
Figure 3:
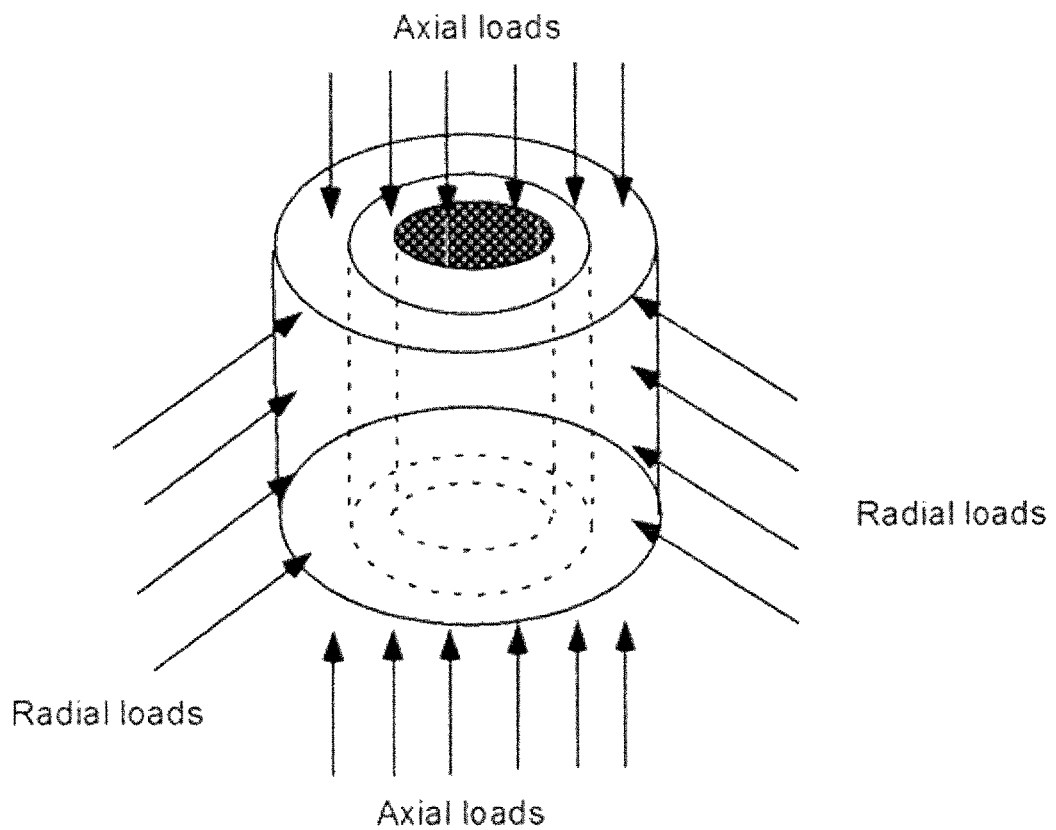
FIG. 3 is a partial cross-sectional view of a directional stress sensor under axial and radial loads.

FIG. 2 is a directional stress sensor that insulates the volume of the stress-measuring medium so that it experiences stress in only one direction. In FIG. 2, the stress measurement direction is an axial direction. The directional stress sensor may measure all normal (e.g., perpendicular) stress components that may be summed to derive a subterranean hydrostatic stress measurement. In FIGS. 2 and 3, a cylindrical sensor housing 202 is positioned such that it receives all the subterranean radial loads that would bias the directional stress sensor. A compliant material 206, such as an air gap and/or an elastomer material for example, may fill the uninterrupted annulus between the sensor housing 202 and the stress sensing material 208. In FIGS. 2 and 3, the compliant material 206 isolates the stress generated from the radial loads that bias the sensor housing 202 from the stress measuring material 208. In FIGS. 2 and 3, the stress measuring materials that fills the axial space of the stress sensor is in direct contact with the axial loads that the stress sensor is to measure. When stiffness matching of a stressed material is desired, the stress-measuring medium 208 may comprise piezospectroscopic and/or elastic materials, cement, an alpha-alumina, or one or more alternative material doped with appropriate amounts of alpha-alumina. Compliant material 206 encases the stress-measuring materials 208 housed within the cylindrical housing 202. The compliant material lies within the annulus that separates the stress-measuring medium 208 and the sensor housing 208.

The directional stress sensor of FIGS. 2 and 3 may measure subterranean stress in a fluid or hardened medium. While the entire sensor housing 202 may be subject to the stresses transferred through the fluid surrounding medium, only the stresses received in the axial direction act on the stress material. In FIGS. 2 and 3, some or all of the one or more single-mode or multi-mode fiber optic cables 110 (one fiber optic cable 110 is shown in FIGS. 2 and 3, respectively) is embedded in the stress-measuring medium 208 bounded by the compliant material 206. In FIGS. 2 and 3, the proximal 214 and/or distal 212 end of the sensor housing 202 may be open to ensure direct contact with some or all of targeted area under measure. The directional stress sensor may be placed in any angular position to measure axial loads in any direction to suit a particular application.

In operation, absorption region light is transmitted (by a source such as a laser that is not shown) through the fiber optic cable 110 embedded in the stress-measuring medium 208. Here, the effect of temperature at the mechanical coupling point 112 and the stress measuring medium 208 is compensated for by measuring stress free samples of the stress-measuring medium 208 at the location or locations of interest and subtracting or adding the contribution representing the temperature contribution to the optical measure.

In use, several directional stress sensors may be arranged to measure strain at zero degrees, forty-five degrees, ninety degrees, etc. to render an entire stress tensor a within a subterranean plane. The directional stress sensors may completely define the stress state at a point inside a material in the deformed state, placement, or configuration. In other words, it may define the tensor's nine components $\sigma_{ij}$.

Figure 4:
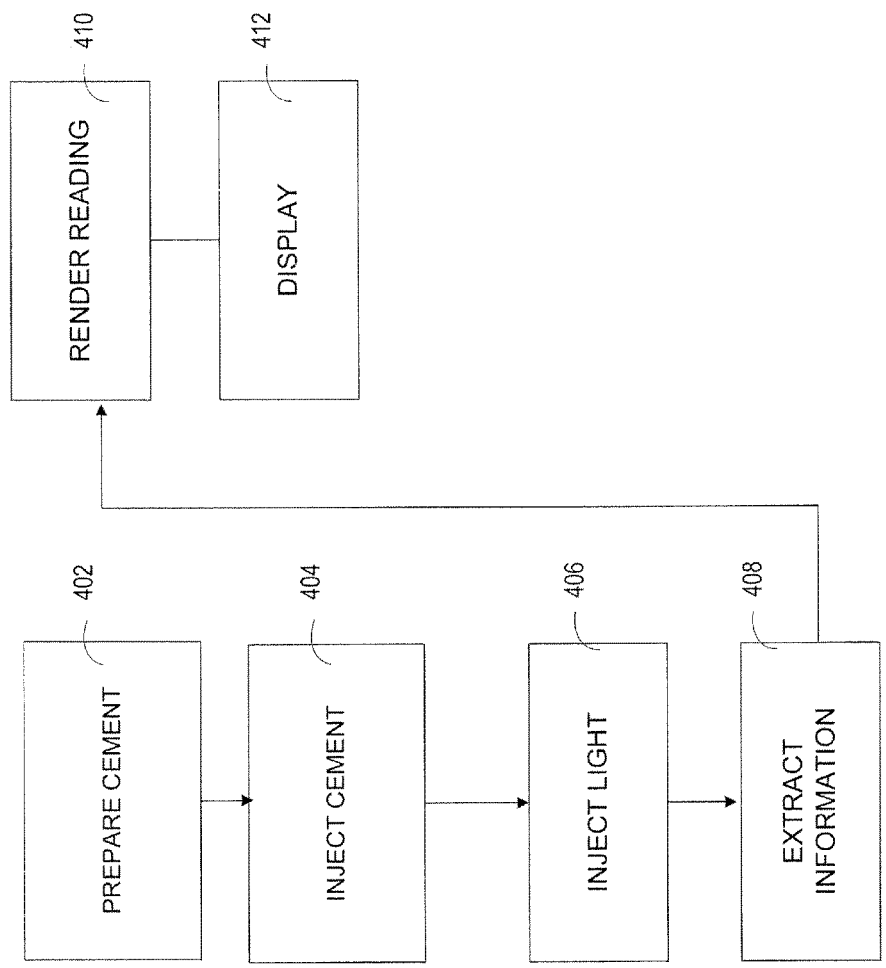
FIG. 4 is process that directly measures mechanical stress in situ.

FIG. 4 is a process that measures the mechanical integrity of a cement structure. The process may be implemented using the systems described in FIG. 1. In FIG. 4, hydrostatic stress is directly measured through the non-destructive process that transforms the primary cement that insulates the wellbore into a situ subterranean stress gauge, optical transducer, and hydrostatic seal. The primary cement serves as a sheath within the annulus 100 between a tubular casing 102 and the rock formation 106. Materials having piezospectroscopic and/or elastic properties are added to the primary cement before injection within the annulus 100 at 402. The properties of the piezospectroscopic and/or elastic additive may be revealed through a photo stimulation may include alpha-$Al_2O_3$ based materials that in some applications may include chromia. The luminescence is measured by one or more single-mode or a multi-mode fiber optic cable 110 (two fiber optic cables 110 were shown in FIG. 1) that are embedded in the piezospectroscopic and/or elastic materials within the annulus 100 bounded by the tubular casing 102 and rock formation 106. During exploration, cement is injected downward through the area 104 enclosed by the tubular casing 102 until it impinges the bottom or in the alternative impinges a physical barrier such as an elastomeric plug that forces the cement up through the annulus 100 of the wellbore at 404. In other systems, the material or cement is pumped directly through an upper opening of annulus 100 around the centralizers 108 that keeps the tubular casing 102 in its proper placement and helps ensure a uniform sheath. The primary cement may be injected until the wellbore is partially or fully encased.

In operation, absorption region light is transmitted (by the laser source that is not shown) through the fiber optic cable 110 embedded in the cement or concrete at 406. Here, the effect of temperature at the mechanical coupling point 112 is compensated for by measuring stress free samples at the location or locations of interest and subtracting or adding the contribution representing the temperature contribution to the optical measure.

While each of the disclosed systems and processes shown in FIGS. 1-4 may stand alone they also may be combined and interface other systems and applications. Other alternate systems and processes may include any combinations of structure and functions described above or shown in one or more or each of the figures and may be part of or used with any infrastructure (e.g., bridges, buildings, roads, railways, tunnels, airports, rapid transit facilities, foundations, dams, coastlines, river embankments, seawalls, docks, canals, sewers, etc.), any structure that uses cement-based composites, or any application measuring stress. These systems or methods are formed from any combination of structure and function described. Further, the piezospectroscopic and/or elastic material additive and cement and/or stress measuring medium 208 may include chromia. In this alternative system and process, chromia dopes the alumina. By heating the alumina for approximately two hours at about 1000° C. adjacent to chromia, the chromia sublimes and diffuses into the alumina substituting Cr for Al in the crystalline structure of the alumina. This combination increases the signal intensity of the solving power (e.g., the R-line intensity, which is the transition wavenumber, wavelength or frequency, divided by the resolution) from the alumina by almost 140 times. Further, this alternative system and process renders compositions with reduced alumina content, greater signal responses, and more consistent signal resolution. This in turn improves stress measurement especially at a target stress measurement resolutions of less than about one MPa. Improving the predictability of the piezo spectroscopic response of the cement and additive or stress-measuring medium allows the systems and methods to obtain absolute measures of stress as opposed to relative changes after cement is curing and set. In addition, these systems increases the speed at which stress measurements may be taken increasing the resolution of stress data generated by cement health monitoring systems, and brings the mechanical and fluid properties of the cement and uncured cement closer to current field values.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate, parts to the second part. The term "substantially" or "about" encompass a range that is largely (ninety five percent or more), but not necessarily wholly, that which is specified. It encompasses all but a significant amount. When operations are responsive to or occur in response to the actions and/or steps of other operations that are occurring, those subsequent operations necessarily occur as a direct or indirect result of the preceding operation. In other words, the operations occur as a result of the preceding operations. A operation that is responsive to another operation requires more than an action (i.e., the operation's response to) merely follow the prior operation.

The disclosed system and method measures subterranean stress. The system and method include a non-destructive sheath enveloping a tubular structure positioned in direct contact with a lateral subterranean rock formation for sensing expansive changes in the subterranean rock formation. A fiber optic 110 is directly embedded in the non-destructive sheath positioned adjacent to the exterior surface of the tubular structure. The fiber optic 110 transmits light and thereafter receives light in proportion to the expansive changes in the subterranean rock formation. As shown in FIG. 1, a spectrometer 114 (two are shown) is connected to the fiber optic 110, which is remote from the non-destructive sheath. The spectrometer 114 measures hydrostatic stress in the subterranean rock formation without estimating acoustoelastic effects or occluding the tubular structure.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system that measures subterranean stress in situ comprising:
   a non-destructive sheath enveloping a tubular structure positioned in direct contact with a lateral subterranean rock formation for sensing expansive changes in the lateral subterranean rock formation;
   a fiber optic directly embedded in the non-destructive sheath positioned adjacent to the exterior surface of the tubular structure for transmitting light and receiving light in proportion to the expansive changes in the lateral subterranean rock formation; and
   a spectrometer coupled to the fiber optic remote from the non-destructive sheath for measuring a hydrostatic stress in the lateral subterranean rock formation without estimating the acoustoelastic effects of the lateral subterranean rock or occluding the tubular structure;
   where the non-destructive sheath comprises an alumina crystalline structure heated up and until 950° C. causing it to change directly from a solid into a vapor.

2. The system of claim 1 where the non-destructive sheath is moisture resistant, stiffens and hardens when it cures, possess plasticity, and is fire resistant.

3. The system of claim 2 where the non-destructive sheath absorbs and stores energy.

4. The system of claim 3 where the non-destructive sheath comprises an alpha-alumina.

5. The system of claim 4 where the non-destructive sheath comprises a Portland cement that forms a hydraulic seal with the alpha-alumina and fiber optic in a wellbore.

6. The system of claim 3 where the non-destructive sheath comprises an alpha-alumina and a chromia.

7. The system of claim 1 where the fiber optic comprises a multi-mode fiber optic configured to allow multiple modes of light to pass through it.

8. The system of claim 1 where the fiber optic comprises a single mode fiber optic that allows only one mode of light to pass through it.

9. The system of claim 1 further comprising means to display and record the hydrostatic stress of the lateral subterranean rock formation in an electronic memory.

10. A method for measuring subterranean stress in situ comprising:
    enveloping a tubular structure with a non-destructive sheath positioned in direct contact with a lateral subterranean rock formation for sensing expansive changes in the subterranean rock formation;
    embedding a fiber optic cable directly in the non-destructive sheath positioned adjacent to the exterior surface of the tubular structure for transmitting light and receiving light in proportion to the expansive changes in the lateral subterranean rock formation; and
    measuring a hydrostatic stress in the subterranean rock formation through the non-destructive sheath without estimating the acoustoelastic effects of the lateral subterranean rock formation or occluding the tubular structure;
    where the non-destructive sheath comprises an alumina heated until it renders an R-line intensity of about one-hundred and forty times greater than the alumina unheated.

11. The method of claim 10 where the non-destructive sheath is moisture resistant, stiffens and hardens when cured, possess plasticity, and is fire resistant.

12. The method of claim 11 where the non-destructive sheath absorbs and stores energy.

13. The method of claim 12 where the non-destructive sheath comprises an alpha-alumina.

14. The method of claim 13 further comprising doping the alpha-alumina with chromia.

15. The method of claim 14 further comprising heating the alumina in a range of one and nine-tenth hours to two hours.

16. The method of claim 10 where the non-destructive sheath comprises a Portland cement that forms a hydraulic seal with the alpha-alumina and fiber optic in a wellbore.

17. A directional stress sensor for measuring subterranean stress comprising:
    a stress-measuring material exposed at a proximal base in direct contact with a single surface of a subterranean media such that it senses stress at only the proximal base in a single axial direction, the stress measuring-measuring material for sensing an axial stress;

a compliant material comprising an elastomer enclosing an entire annular area between a sensor housing and the stress sensing materials that extends from the proximal base to a distal base of the stress-measuring material, the compliant material isolates the stress-measuring material from the sensor housing isolating the stress measuring material from an entire radial stress received from the subterranean media;

the sensor housing enclosing the annular surfaces of the stress measuring material and the compliant material in lateral contact with the subterranean media; and a fiber optic directly embedded in the stress-measuring material passing through the proximal base for transmitting light and receiving light in proportion to the expansive changes in the subterranean media.

18. The system of claim 17 where the compliant material comprises an annular air gap and annular elastomer.

19. The system of claim 17 further comprising a spectrometer coupled to the fiber optic remote from the stress-measuring material for measuring stress in the subterranean media without measuring acoustoelastic effects.

20. The system of claim 19 where the spectrometer is programmed to measure birefringence.

21. The system of claim 17 further comprising a light source for transmitting light in the absorption area through the optic.

22. A sensor for measuring the local stress of a concrete structure comprising:

a fiber optic cable encased by an outer jacket, said cable having a distal end terminating at a stress measurement area within the concrete;

a light source for transmitting a light into a proximal end of said cable from a location that is remote of the stress measurement area; and a spectrometer for receiving a signal from the proximal end that is indicative of the local stress of the concrete at the stress measurement area;

where the cement in at least the stress measurement area is doped with a solid crystalline structure that is heated up and until it reaches an R-line intensity of about one-hundred and forty times greater than solid crystalline structure when unheated.

* * * * *